United States Patent [19]

Johannesson

[11] Patent Number: 4,552,496

[45] Date of Patent: Nov. 12, 1985

[54] DIVIDED MILLING CUTTERS

[76] Inventor: Lennart Johannesson, Parkgatan 41, S-571 00 Nässjö , Sweden

[21] Appl. No.: 455,825

[22] Filed: Jan. 5, 1983

[30] Foreign Application Priority Data

Jan. 7, 1982 [SE] Sweden ................................ 8200034

[51] Int. Cl.⁴ ................................................ B23B 31/40

[52] U.S. Cl. .................................. 409/209; 144/90 A; 409/204; 409/234

[58] Field of Search ............ 144/134 A, 134 R, 90 A; 409/204, 213, 217, 234, 206, 207, 209

[56] References Cited

U.S. PATENT DOCUMENTS

| | | | |
|---|---|---|---|
| 987,391 | 3/1911 | Mitchell | 144/90 A |
| 1,213,888 | 1/1917 | Lane | 144/134 A |
| 1,630,173 | 5/1927 | Dumont | 144/134 R |
| 2,474,559 | 6/1949 | Walters | 144/218 |
| 3,352,334 | 11/1967 | Hunn | 144/134 R X |
| 3,373,658 | 3/1968 | Larsen | 409/206 X |
| 3,864,054 | 2/1975 | Exsel | 408/147 |
| 3,946,777 | 3/1976 | Heimbrand | 144/90 A |
| 4,244,248 | 1/1981 | Adell et al. | 409/234 X |

FOREIGN PATENT DOCUMENTS

| | | | |
|---|---|---|---|
| 1115038 | 12/1981 | Canada | 144/90 A |
| 2436810 | 2/1976 | Fed. Rep. of Germany | 409/234 |
| 0629042 | 9/1978 | U.S.S.R. | 409/207 |

*Primary Examiner*—William R. Briggs
*Assistant Examiner*—Glenn L. Webb
*Attorney, Agent, or Firm*—Cushman, Darby & Cushman

[57] ABSTRACT

Improvements in divided milling cutters comprise a first cutter half (2) and a second cutter half (6) which are adjustable in relation to each other with respect to their mutual distance and are both connected to a common sleeve (1) threadable on to and securable to a cutter spindle or the like which is preferably threaded, at least in part. To make possible a continuous or step-less variation of the distance between the cutting edge holders in a simple way even when the apparatus is mounted on the cutter spindle said second cutter half (6) is fastened to an outer sleeve (8) which is in threaded engagement with an externally threaded intermediate sleeve (13) having a substantially annular flange (14) which abuts an end or shoulder on the common sleeve. In working position all sleeves (1, 13, 8) are retained on the cutter spindle by means of a nut which is threaded on to the cutter spindle and presses against one end of the outer sleeve, possible under the intermediary of an intermediate pressure ring (19), or by hydraulic locking means.

5 Claims, 4 Drawing Figures

DIVIDED MILLING CUTTERS

BACKGROUND OF THE INVENTION

This invention relates to such improvements in divided milling cutters as are generally defined in the preamble of claim 1.

Divided milling cutters of the type to which this invention relates are utilized particularly in the wood working industry, e.g. for tonguing or grooving or alternatively simultaneous round-planing or bevelling of two opposing edges of boards and the like. When boards of another thickness than previously are to be planed, one will have to change the distance between the first (upper) milling cutter half and the second (lower) milling cutter half. A traditional way of carrying out this operation (So called "setting") involves inserting or removing of a greater or smaller number of spacing washers, each having a greater or smaller thickness, between the two cutter halves. This setting operation is tedious and time consuming, since a plurality of bolts have to be unscrewed and tightened again, and it can not be carried out without previous removal of the milling cutter head from the cutter spindle. Another drawback resides therein that the distance adjustment can not be made step-less or continous.

With regard hereto a continously adjustable milling cutter head has been devised long ago, which forms the subject matter of the Swedish Pat. No. 19595. In this prior art device both the lower milling cutter half and the upper cutter half are threaded on to and secured to an externally threaded sleeve by locking nuts. Since the inner cutter half and its locking nut are threaded on from one and the same direction and upon one and the same thread (i.e. not from different directions on to a left-hand thread and a right-hand thread, respectively, which would be most suitable) it is impossible in practice to maintain the initially set distance between the two cutter halves. Furthermore the locking nut of the inner cutter half restricts the minimum distance possible between the cutter halves. In addition hereto resin and other impurities easily get stuck between the halves of the milling cutter, their locking nuts and on the outer thread cooperating therewith.

SUMMARY OF THE INVENTION

In view of the above circumstances the principal object of the invention resides in providing setting means of the above kind which permits continous setting or adjustment of the distance between the cutter halves while they remain on the spindle, and which in addition hereto is easy to keep clean.

This object is attained thanks to the fact that the improvement is so designed as is set forth in the characterizing clause of claim 1.

Further features and advantages of the apparatus or improvement according to the invention will become apparent from the following detailed description and the annexed drawings which diagrammatically and as nonlimiting examples illustrate two preferred embodiments of the invention.

Figure 1:
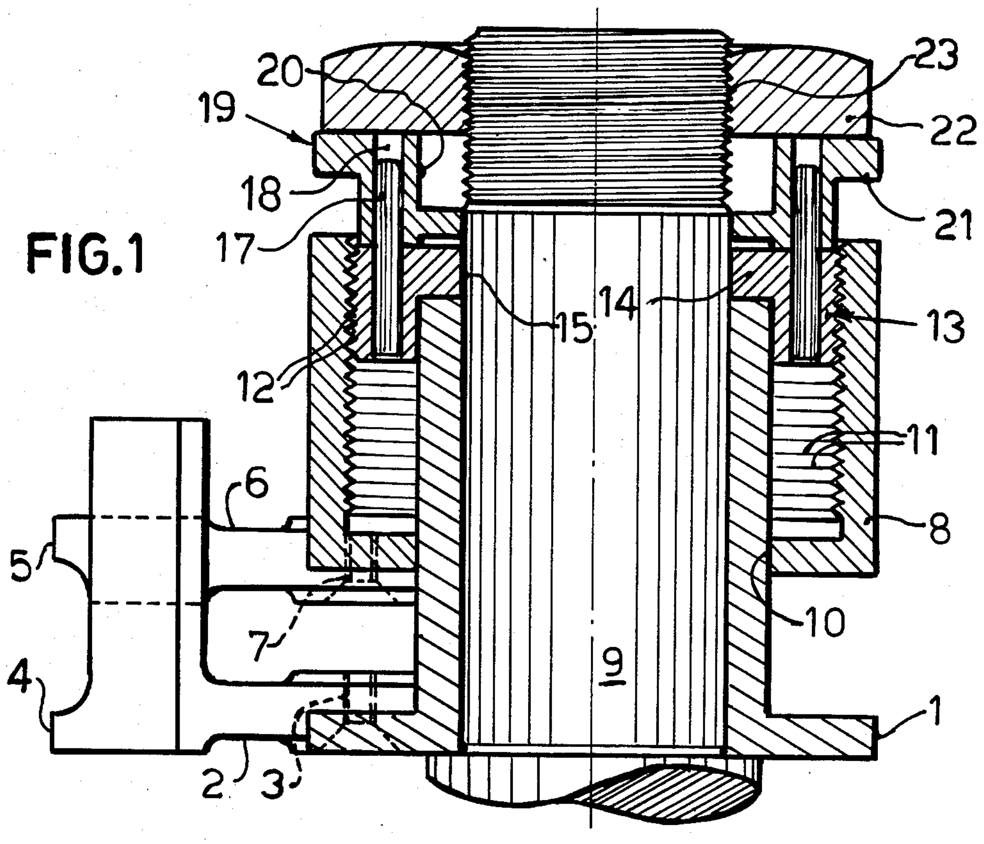
FIG. 1 is a diagrammatic longitudinal sectional view through an apparatus according to the invention and illustrates the parts of the apparatus in a first mutual position.
Figure 2:
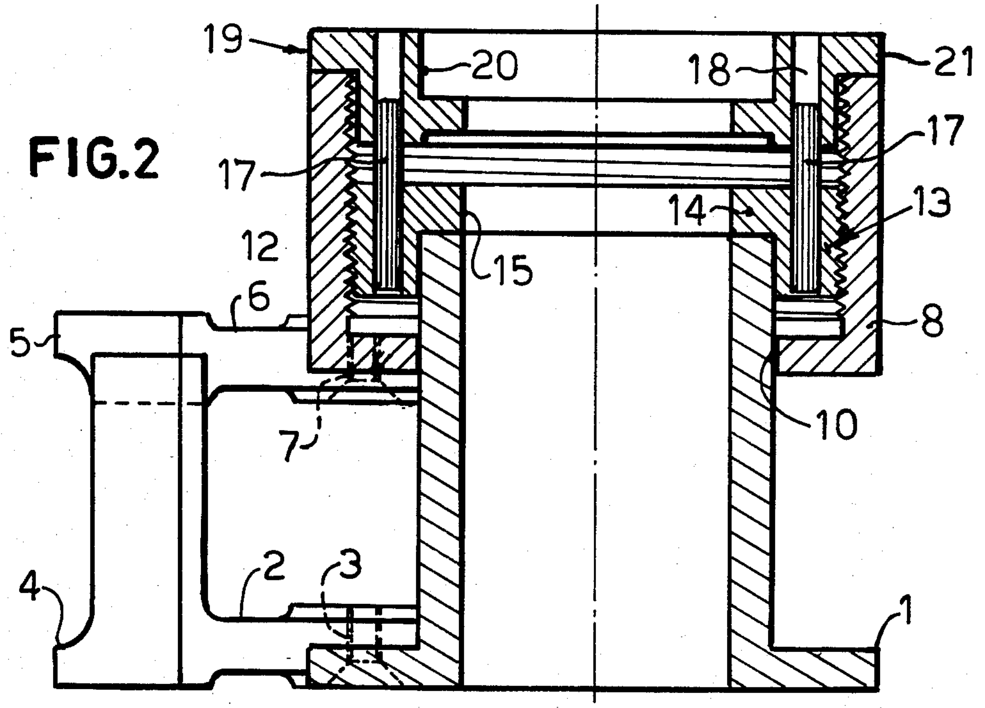
FIG. 2 is an axial sectional view corresponding to FIG. 1 and illustrating the parts in a second mutual position.

The apparatus shown in FIGS. 1 and 2 of the drawings comprises a first, inner sleeve 1 which is intended to be secured to a milling cutter spindle 9 which in this embodiment has to be threaded at least at its free end, and to be rotated together with the spindle. To the sleeve 1 a first, exchangeable milling cutter half 2 which is shown only in part, is secured by means of screws 3, which are merely indicated. The cutter half 2 carries a first set of cutting edges 4 of which only one is shown. The cutting edges 4 cooperate with a second set of cutting edges 5 of which only one is shown. The cutting edges 5 are carried by a second milling cutter half 6 which is exchangeably secured to an outer sleeve 8 by means of screws 7 (merely indicated). In the illustrated embodiment the sets of cutting edges 4, 5, which are angularly staggered or displaced with respect to each other, are intended for the rounding or bevelling of two opposite, longitudinal edges of a board or deal which is about 25 mm in thickness (according to FIG. 1).

The lower end of the sleeve 8 in FIG. 1 has an annular flange which is directed radially inwards and encircles an opening 10 which is coaxial with the sleeve and has an insignificantly larger diameter than the tubular principal portion of the sleeve 1 which penetrates into the sleeve 8 through this opening.

On its entire inside the sleeve 8 is provided with an internal thread 11 which has a predetermined lead, e.g. 2 mm. Cooperating with this thread 11 is an external thread 12 on an intermediate sleeve which is generally designated 13. The intermediate sleeve 13 has an inner diameter which is insignificantly greater than the outer diameter of the tubular portion of sleeve 1, so that the sleeve 13 may be threaded on thereto. Sleeve 13 also has an annular flange 14 which is directed radially inwards and defines an opening 15 having a diameter which substantially equals the inner diameter of the inner sleeve 1. Sleeve 13 rests upon the end of the sleeve 1 by means of this annular flange 14.

In the intermediate sleeve 13 there are secured a pair of pins or studs 17 which suitably are located diametrically opposite to each other. These studs which have a greater axial length than the sleeve 13 and accordingly project from its one (the upper one in FIG. 1) end surface are intended to cooperate with a pair of through apertures 18 which are located at the same mutual distance as are the studs 17 in a compression ring which is generally designated 19. This compression ring 19 has a tubular portion 20 with an outer diameter, which is insignificantly smaller than the free inside diameter of the outer sleeve 8, and a radially projecting collar 21 which suitably has at least the same outer diameter as the sleeve 8 so that the collar 21 can be pressed against the end surface of the sleeve 8. The outside circumferential surface of the collar 21 is suitably corrugated to make it easier to turn the compression ring by hand.

It is obvious that the outer sleeve 8 and accordingly also the cutter half 6 and the set of cutter edges 5 are displaced when the intermediate sleeve 13 is rotated manually or by a suitable tool by means of the studs 17 or the ring 19 cooperating therewith. An axially extending groove, in which a scale or graduation 17 may be provided, may be milled or manufactured in another way in the internal thread of the outer sleeve 8. This scale may indicate the displacement of the sleeve 8 from a predetermined reference or initial position, e.g. when the upper surface of the sleeve 8 is located in the same plane as the upper surface of the intermediate sleeve 13, said plane being perpendicular to the common centre axis of the spindle and the sleeves. This upper surface of the sleeve 13 may be provided with an arrow or another designation which cooperates with a scale of fractions of a revolution on the upper surface of the sleeve 8. With a lead e.g. of 2 mm according to the above, a rotation of $3\frac{1}{4}$ revolutions of the intermediate sleeve 13 corresponds to an axial displacement of 6.5 mm of the outer sleeve 8 in relation to the inner sleeve 1.

As is apparent from the above, it is very easy to adjust the distance between the two sets of cutting edges 4 and 5, respectively, by means of the apparatus according to the invention. Such adjustment or setting may be carried out even without removal of the divided cutter from its cutting spindle 9. After setting, the whole device is locked with the individual parts in their respective set positions on the milling cutter spindle by pressing the annular flange 21 against the end surface of the outer sleeve by means of a locking nut 22 which is tightly threaded on to the above-mentioned threaded portion 23 of the milling cutter spindle 9. To permit carrying out of this operation it is obviously necessary to turn the intermediate sleeve 13 upside down with respect to its position in FIG. 1 with the setting of the set of cutting edges 5 as illustrated in this Figure. A special pressure ring may be necessary.

Figure 3:
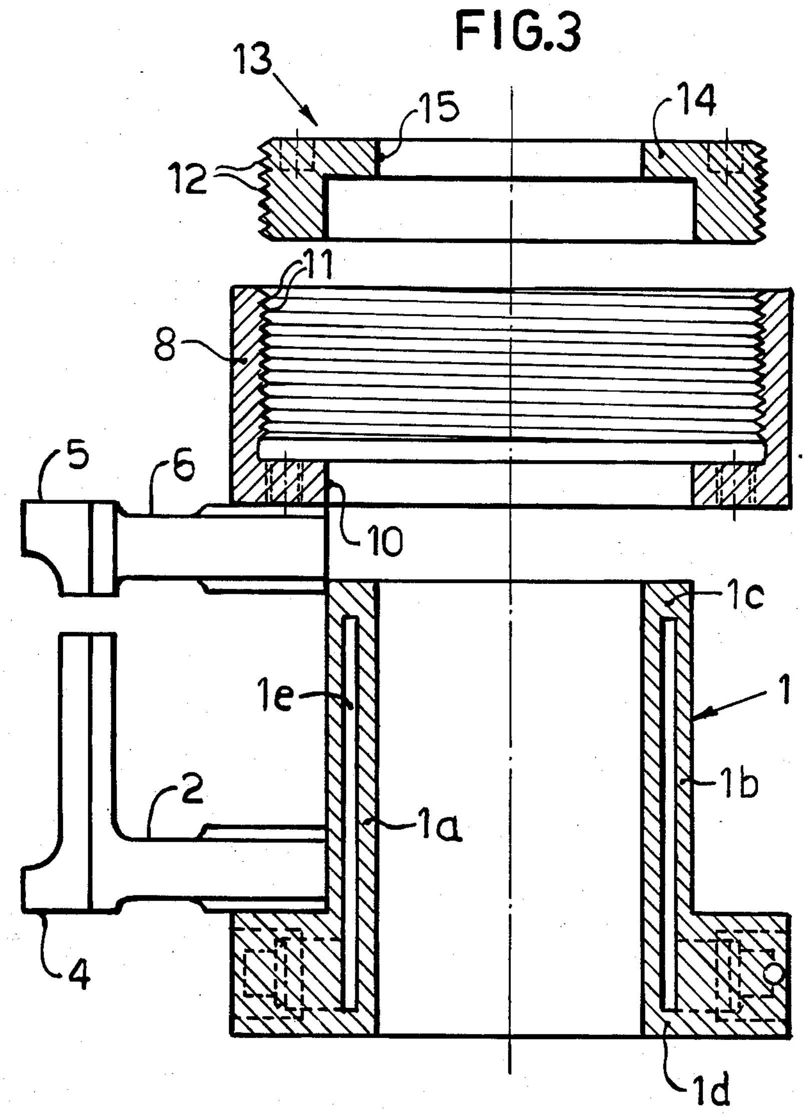
FIG. 3 is a partial, simplified exploded longitudinal sectional view of a second embodiment of the invention in which hydraulic locking of the cutter halves is utilized.
Figure 4:
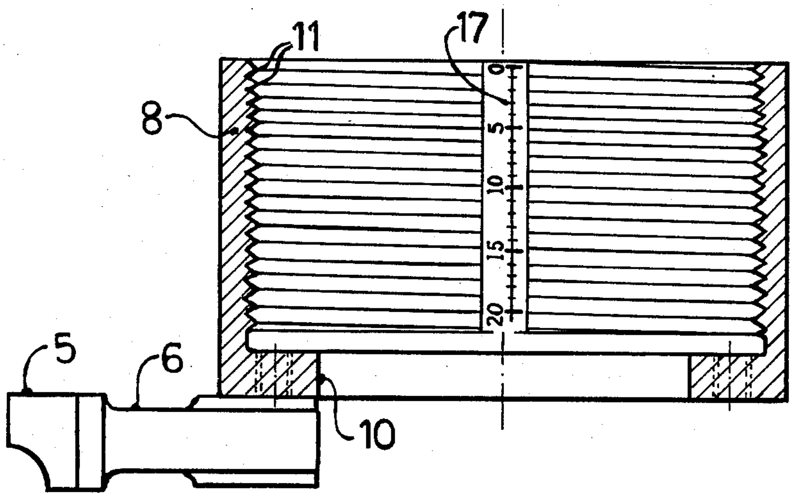
FIG. 4 is an axial cross-section through the outer sleeve.

The embodiment according to FIG. 3, in which the same reference numerals as in FIGS. 1–2 have been utilized to designate same or similar parts differs from that described above primarily therein that the cutter halves 2 and 6 are locked or clamped hydraulically instead of mechanically. Thus, according to FIG. 3 the inner sleeve 1 is a hydraulic sleeve. This sleeve is double or slotted and comprises two hardened steel sleeves 1*a*, 1*b* which are united with each other at their ends as shown at 1*c* and 1*d*. The sleeves 1*a*, 1*b* are separated by a cylindrical slot 1*e* which is filled with grease which acts as a pressure medium. When pressurizing with a grease pump, the outer sleeve 1*b* expands towards the tool and the inner 1*a* towards the spindle. In this way the tool is automatically centered and clamped. The slot 1*e* is sufficiently deep for penetrating into the sleeve or ring 13. One preferred form of such hydraulic sleeves is manufactured and marketed under the Swedish registered trademark "ETP" Hydro-Grip by FFV Industriprodukter AB, Linköping, Sweden. The pressure ring 19 and the pins 17 are not required in this embodiment.

The embodiments described above and illustrated in the drawings are, of course, to be regarded merely as nonlimiting examples and may as to their details be modified in several ways within the scope of the following claims. In particular, the means for turning the intermediate sleeve may be designed in another way.

What I claim is:

1. A divided milling cutter comprising a cutter spindle having an annular shoulder and a threaded portion which is axially spaced from said annular shoulder; an inner sleeve slidable on to and securable to said cutter spindle between said threaded portion and said annular shoulder; a first cutter half releasably secured to said inner sleeve; a second cutter half; and means for securing said second cutter half to said cutter spindle in a position which is adjustable in the axial direction with respect to said first cutter half, wherein said securing means comprises a first annular abutment surface at one end of said inner sleeve for engaging said annular shoulder of said cutter spindle; a second annular abutment surface at the other end of said inner sleeve; an intermediary sleeve having an inner, annular flange for engaging said second abutment surface of the inner sleeve, external threads, and first coupling means; an outer sleeve having internal threads for cooperation with the external threads of said intermediary sleeve, and an annular flange which is directed radially inwards and slidingly encircles said spindle and to which said second cutter half is fastened, said annular flange of the outer sleeve being located at that end of the outer sleeve which is adjacent to said first cutter half; and a pressure ring having a tubular portion which is insertable into said outer sleeve and is provided with second coupling means for engagement with said first coupling means of the intermediate sleeve, said first and second coupling means being constructed for transferring a torque from said pressure ring to said intermediary sleeve, and an annular flange projecting radially outwards from said tubular portion; and a locking nut having internal threads for engaging the threads of said threaded portion of said cutter spindle.

2. A divided milling cutter according to claim 1, wherein one of said first and second coupling means comprises a pair of spaced bores, which are substantially parallel to the center axis of said spindle and the other one of said first and second coupling means comprises a pair of pins which are parallel to the center axis of said spindle and have the same mutual interspace as said bores and are introducible therein for permitting rotation of the intermediate sleeve by means of the pressure ring.

3. A divided milling cutter according to claim 2, wherein said pair of bores are located in said pressure ring, and said pair of pins are secured to the intermediate sleeve.

4. A divided milling cutter according to claim 1 characterized by the provision of a scale in the internal threads (11) of the outer sleeve (8) for determining and making ascertainable the axial position of the outer sleeve in relation to the intermediate sleeve (13) and according also the position of the first set of cutting edges (4) in relation to the second set of cutting edges (5).

5. A divided milling cutter according to claim 1, characterized by the provision of a scale in the internal threads (11) of the outer sleeve (8) for determining and making ascertainable the axial position of the outer sleeve in relation to the intermediate sleeve (13) and accordingly also the position of the first set of cutting edges (4) in relation to the second set of cutting edges (5).

* * * * *